May 18, 1943. E. N. VIGNEAU 2,319,757
NUT CRACKING APPARATUS
Filed Oct. 18, 1940 2 Sheets-Sheet 2
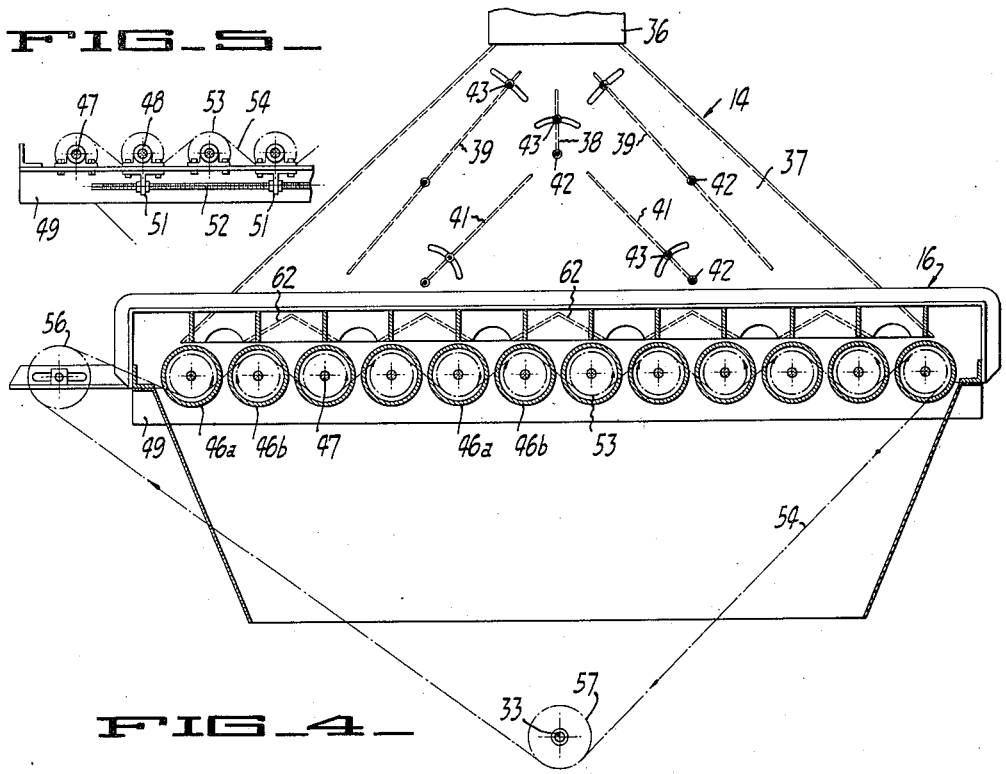
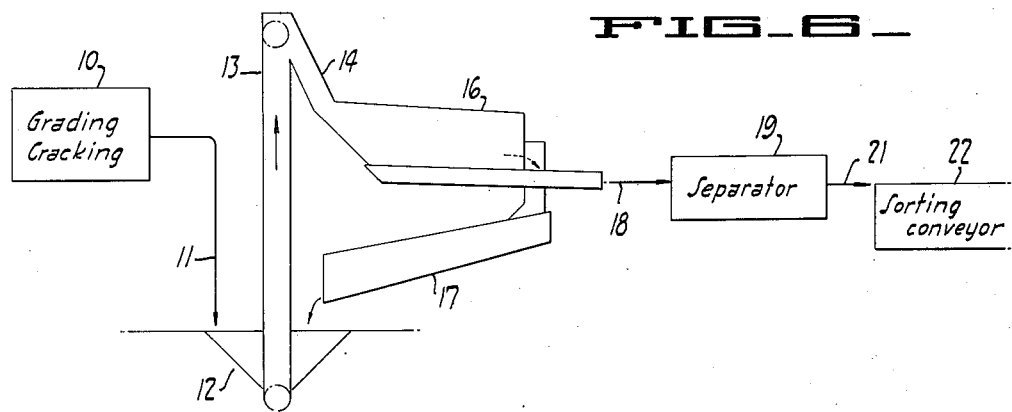
INVENTOR
*Emile N. Vigneau*
BY *Paul D. Fehr*
ATTORNEY Patented May 18, 1943

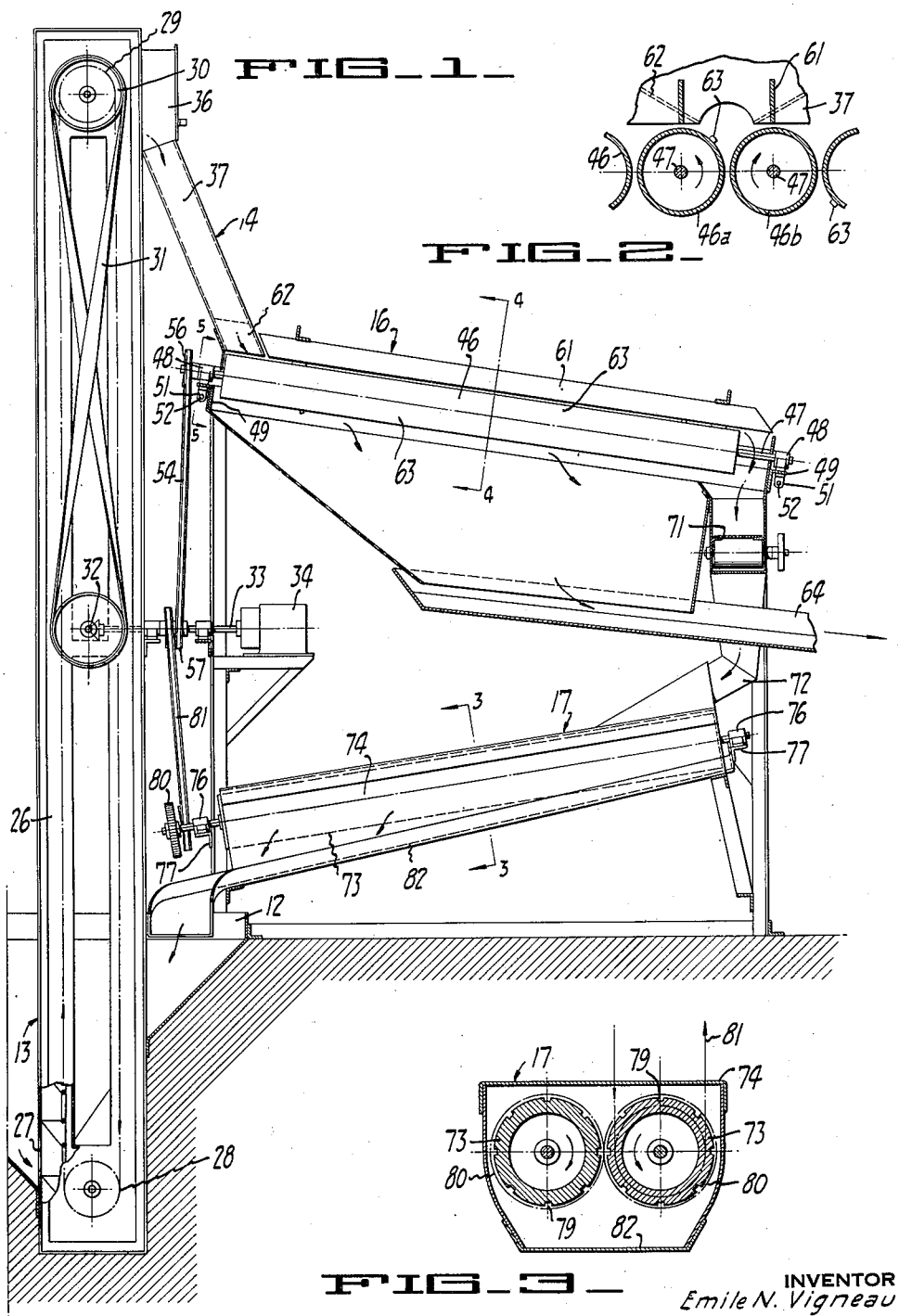

2,319,757

UNITED STATES PATENT OFFICE 2,319,757

NUT-CRACKING APPARATUS

Emile N. Vigneau, San Francisco, Calif., assignor to Rosenberg Bros. & Co., San Francisco, Calif., a corporation of California Application October 18, 1940, Serial No. 361,668

5 Claims. (Cl. 146—11)

This invention relates to the cracking of nuts such as walnuts, and is concerned more particularly with the provision of an improved apparatus and method for recovering the meats from imperfectly cracked nuts.

It is an object of the invention to provide for the recovery of the meats from imperfectly cracked nuts such as whole nuts which are only partially cracked and the half nuts which are commonly referred to as "splits," in which the nut, such as a walnut, separates into two halves without releasing the meat from the half shell.

Another object of the invention is to provide a method and apparatus of the character referred to wherein the imperfectly cracked nuts received from conventional cracking apparatus are separated from the properly cracked nuts, are recracked, and again placed in the flow of cracked nuts for subsequent treatment to separate the nut meats from the shells.

Another object of the invention is to provide an apparatus of the character referred to which is of a simple construction and which can be readily adapted for use with various forms of nut cracking and treating apparatus.

Other objects and advantages of the invention will be apparent from the following description of a preferred embodiment thereof, as illustrated in the accompanying drawings, in which:

Figure 1 is a side elevational view of nut cracking apparatus designed to enable the recovery of meats from imperfectly cracked nuts;

Figure 2 is a fragmentary sectional view of separating rolls for separating the improperly cracked nuts from the properly cracked nuts;

Figure 3 is a sectional view of the nut cracking rolls employed for recracking operations, the plane of the view being indicated by the line 3—3 in Fig. 1;

Figure 4 is a sectional elevational view through the apparatus taken in a plane indicated by the line 4—4 in Figure 1;

Figure 5 is a fragmentary elevational view of a part of the separating rolls, the view being taken as indicated by the line 5—5 in Figure 1;

Figure 6 is a diagrammatic view illustrating the entire process of recovering the nut meats.

Referring first to Figure 6, the present invention contemplates the cracking of the nuts either with or without grading by any suitable apparatus as indicated schematically at 10 in Figure 6 from which the cracked nuts are discharged as indicated by the arrow 11 to a hopper 12. From the hopper 12 the cracked nuts are elevated by a suitable elevating conveyor 13 and are discharged through a distributing device 14 onto a separating apparatus indicated generally at 16. The separating apparatus serves to remove the imperfectly cracked nuts from those which are sufficiently cracked to separate the meats from the shells.

From the separating apparatus 16, the improperly cracked nuts are fed to a recracking apparatus indicated at 17 from which they are fed to the hopper 12 to mingle with the discharge from the initial cracking apparatus 10. The properly cracked nuts are conveyed from the separator 16 as indicated by the arrow 18 to a nut meat and shell separator 19, which may be of the usual pneumatic type, and serves to separate out the shells from the meats. The nut meats are fed as indicated by the arrow 21 to sorting conveyors indicated generally at 22 where the various grades of nut meats are sorted manually.

From the above description, it is seen that improperly cracked nuts which may consist of either uncracked nuts, partly cracked nuts, or splits, in other words the nuts which are not cracked sufficiently to release the meat, are separated from the main flow of cracked nuts, and carried through a recracking apparatus and then back into the main flow of cracked nuts. In this way any improperly cracked nuts will be diverted from the main path of flow and subjected to the recracking operation.

Figures 1 to 5 illustrate a preferred embodiment of the separating and recracking apparatus. The hopper 12 (Figure 1) has its discharge outlet opening into the bottom pick-up portion of a casing 26 within which a bucket-type elevator 27 of the elevating conveyor 13 is mounted. Elevator 27 is of conventional construction and has its chains trained about suitable sprockets 28 and 29. Driving sprocket 29 is driven by pulley 30 and connected by a belt drive 31 with a shaft 32. Shaft 32 is driven through suitable bevel gearing from drive shaft 33 connected to motor 34.

The elevator 27 serves to pick up cracked nuts from the hopper 12 and discharge them into a distributing chute leading to means for removing improperly cracked nuts from the main body of material consisting of separated nut meats and shells. To receive the discharge from the buckets, the casing 26 is provided with a discharge conduit 36 (Figs. 1 and 4) which communicates at its lower end with a divergent distributing chute 37. Chute 37 is provided with a plurality of material distributing blades 38, 39 and 41 which may be suitably disposed to effect even distribution of the material as it falls through the chute. Blades 38, 39 and 41 may be suitably mounted about the pivots 42 and secured in adjusted position by thumb nuts 43 extending through suitable arcuate slots in the wall of the chute.

The distributing blades serve to receive the cracked nuts and deliver them evenly to the separating mechanism 16 which may comprise a series of separating troughs formed by a series of spaced-apart inclined rolls 46. Each roll 46 has its shaft 47 journalled in respective bearings 48 adjustably mounted on cross angles 49 of the frame. Each alternate roll 46 has its bearings 48 provided with a depending threaded portion 51 (Figures 1 and 5) and the various portions 51 at each end are engaged by a common threaded rod 52 to permit gang adjustment of the rolls. In this way the width of the opening can be varied, and if desired, the opening can be made slightly divergent from end to end of the rolls.

The rolls 46 are arranged in pairs as shown at 46a and 46b in Figs. 2 and 4 which are driven by suitable means to provide for upward travel of the adjacent surfaces of each pair of rolls, as indicated by the arrows in Fig. 2. Such drive means may comprise a suitable sprocket 53 on each roll shaft 47 which are engaged by a common drive chain 54 which passes successively to the upper and lower sides of the adjacent sprockets. The chain 54 also engages an adjustable idler sprocket 56 (Fig. 4) and a driving sprocket 57 (Figs. 4 and 1) mounted on drive shaft 33.

As previously explained, the rolls 46 are arranged in pairs to provide a longitudinal separating space or slot between each pair to which material is fed from the distributing chute 37. In order to prevent feed of material to adjacent rolls which have their surfaces traveling downwardly, V-shaped partitions 62 may be provided in the conduit 14 above the openings between the adjacent pairs of rolls. Dividing strips 62 extend longitudinally above each roll to prevent passage of the cracked nuts from between a pair of rolls providing a separating opening to rolls which have their adjacent surfaces travelling downwardly.

The rolls 46, as shown in Figure 1, are arranged with their feed end uppermost and inclined downwardly so that the cracked nuts travel downwardly over the rotating rolls, the nuts and shells which have been separated falling down between the rolls. In order to insure this falling action, the rolls may be provided with a series of fingers or small projections 63 which will serve to shift any nut meat or shell which may be travelling crosswise into a position to fall between the rolls. The separated meats and shells which fall between the rolls are delivered to a discharge chute 64 from which they are carried to the separator 19, as previously described.

The improperly cracked nuts, namely those only partly cracked, totally uncracked and splits, are delivered from the ends of the rolls to a conveyor belt 71 (Fig. 1) which delivers such improperly cracked nuts to a discharge chute 72 leading to a pair of spaced apart cracking rolls 73 housed within a casing 74. Rolls 73 are suitably journalled and supported at their ends by appropriate bearings 76. Bearings 76 may have a slidable adjustment on their supporting angles 77 to adjust the spacing between the rolls.

The rolls 73 are mounted in inclined position and are driven to cause their adjacent surfaces to travel downwardly so that the improperly cracked nuts are drawn between the rolls 73. Rolls 73 may also be provided with longitudinal grooves or corrugations 79 to facilitate engagement with and feeding of the nuts therebetween. The rolls 73 are geared together by means of a gear connection 80 and are driven through a sprocket and chain drive 81 from the shaft 33. The casing 74 has its bottom formed as a discharge chute 82 which leads to the hopper 12 so that the discharge from the re-cracking operation is mingled with the discharge from the main cracking operation.

To summarize the operation of the apparatus, the nuts are first cracked in the grading and cracking apparatus 10 and then delivered to the hopper 12, from which they are picked up by the elevator conveyor 13. From the elevator conveyor 13, the cracked nuts are discharged through the conduit 14 into the separating apparatus 16. Apparatus 16 comprises a series of rolls 46 mounted in inclined relation and driven so that the adjacent surfaces of the separating pairs of rolls are travelling upwardly. The cracked nuts therefore travel downwardly along the rolls, having their positions shifted by the projections 63 so that all of the separated meats and shells fall downwardly through the rolls and are carried out by the discharge chute 64 for further treatment such as separation of the meats from the shells, and sorting of the meats. The improperly cracked nuts are discharged over the ends of the rolls 46 and delivered by the conveyor 71 and the discharge chute 72 to the re-cracking rolls 73. After the cracking operation of the rolls 73, the re-cracked nuts are delivered from the discharge chute 82 to the hopper 12 where they are again entrained with the main flow of cracked nuts.

I claim:

1. In an apparatus for the cracking of nuts such as walnuts, means including a pair of smooth surfaced spaced-apart rolls of substantially uniform diameter for separating improperly cracked nuts from properly cracked nuts, said rolls having their axes inclined downwardly from the feed end to the discharge end thereof, means for driving said rolls to cause their adjacent surfaces to travel upwardly, means for feeding nuts to said separating means, nut cracking means for receiving improperly cracked nuts from said separating means, and means for feeding cracked nuts from said cracking means to said first-named feeding means.

2. In an apparatus for the cracking of nuts such as walnuts, means including a pair of smooth surfaced spaced-apart rolls of substantially uniform diameter for separating improperly cracked nuts from properly cracked nuts, said rolls being inclined downwardly from the feed end to the discharge end thereof, means for driving said rolls to cause their adjacent surfaces to travel upwardly, means for feeding nuts to said separating means, nut cracking means for receiving improperly cracked nuts from said separating means, and means for feeding cracked nuts from said cracking means to said first-named feeding means.

3. In an apparatus for the recovery of meats from nuts such as walnuts, a hopper for receiving cracked nuts, means including a pair of smooth-surfaced, spaced-apart rolls for separating improperly cracked nuts from properly cracked nuts, said rolls being positioned above said hopper, an elevator for conveying nuts from said hopper for discharge to said rolls, said rolls having their axes inclined from the feed end to the discharge end for gravity feed of nuts therealong, a pair of cracking rolls positioned below said separating rolls and above said hopper, said cracking rolls having their axes inclined from their feed to their discharge end, means for feeding improperly cracked nuts from said separating means to said cracking rolls, and gravity means for directing the discharge from said cracking rolls to said hopper.

4. In an apparatus for the recovery of meats from nuts such as walnuts, a hopper for receiving cracked nuts, means including a pair of smooth-surfaced spaced-apart rolls for separating improperly cracked nuts from properly cracked nuts, said rolls being of uniform diameter throughout their length and being spaced apart an amount to prevent whole nuts passing therebetween while permitting passage of nut meats and cracked shells, means for feeding nuts from said hopper to said separating means, a pair of cracking rolls for receiving improperly cracked nuts from said separating means and for effecting a cracking operation thereon, and means directing the discharge from said cracking rolls to said hopper.

5. In apparatus for freeing the meat of nuts such as walnuts, where the nuts are first cracked in associated cracking means, a pair of substantially smooth surfaced rolls disposed side by side and rotated in opposite directions to cause their adjacent peripheral surfaces to travel upwardly, means for feeding the cracked nuts to one end of the rolls, the rolls being inclined downwardly from the feeding end with their peripheries spaced a substantially uniform distance apart to cause the properly cracked material and freed meat to pass between the rolls and to cause uncracked and improperly cracked nuts to progress along the rolls to the lower discharge end of the same, nut cracking means, means for feeding the uncracked and imperfectly cracked nuts discharged from the lower end of the rolls to said last named cracking means, and means for returning the cracked material from said last means to the feeding end of the rolls.

EMILE N. VIGNEAU.